United States Patent [19]
Kogure et al.

[11] 3,925,458
[45] Dec. 9, 1975

[54] PROCESS FOR PREPARING 2-(4-ALKYLPHENYL)-PROPION-ALDEHYDE AND PROPIONIC ACID

[75] Inventors: Katsura Kogure; Kunio Nakagawa, both of Kawagoe, Japan

[73] Assignee: Nisshin Flour Milling Co., Ltd., Tokyo, Japan

[22] Filed: Jan. 25, 1974

[21] Appl. No.: 436,634

[30] Foreign Application Priority Data
Jan. 29, 1973    Japan................................. 48-11166

[52] U.S. Cl...... 260/523 A; 260/473 A; 260/521 R; 260/599
[51] Int. Cl.²................... C07C 51/26; C07C 47/48
[58] Field of Search............ 260/523 R, 523 A, 515, 260/599

[56]    References Cited
FOREIGN PATENTS OR APPLICATIONS
1,160,725    8/1969    United Kingdom................. 260/523

*Primary Examiner*—John F. Terapane
*Attorney, Agent, or Firm*—James C. Haight

[57]    ABSTRACT

A new process for preparing a 2-(4-alkylphenyl)-propionaldehyde which is an intermediate product useful for the production of a 2-(4-alkylphenyl)-propionic acid known as a valuable anti-inflammatory agent, is now provided. This new process comprises treating an alkyl 2-hydroxy-3-(4-alkylphenyl)-3-butenoate with an acid to give a high yield of the aimed 2-(4-alkylphenyl)-propionaldehyde through a new reaction. This process is operable in a facile way and suitable for a commercial production of 2-(4-alkylphenyl)-propionaldehyde which is readily oxidisable to the corresponding substituted propionic acid compound.

10 Claims, No Drawings

PROCESS FOR PREPARING 2-(4-ALKYLPHENYL)-PROPION-ALDEHYDE AND PROPIONIC ACID

This invention relates to a new process of preparing a 2-(4-alkylphenyl)-propionaldehyde which is an intermediate product useful for the production of 2-(4-alkylphenyl)-propionic acids. This invention further relates to a new process of producing a 2-(4-alkylphenyl)-propionic acid.

2-(4-Lower alkylphenyl)-propionic acids and their pharmaceutically acceptable derivatives are known to have a high anti-inflammatory activity and have widely been used in the treatment of diseases caused by inflammation, such as rheumatism. Of the 2-(4-alkylphenyl)-propionic acids, 2-(4-isobutylphenyl)-propionic acid is most useful for this therapeutic purpose.

It is known that the synthesis of a 2-(4-alkylphenyl)-propionic acid of the formula (VI):

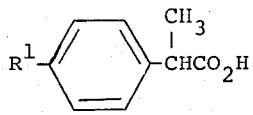

wherein R¹ stands for a lower alkyl group of 2–4 carbon atoms can be conducted by various methods described in the specifications of Japanese patent publication No. 7491/65, No. 22297/68 and No. 24550/72. However, all these prior art methods suffer from some drawback and are not very suitable for the production of the 2-(4-alkylphenyl)-propionic acid in a commercial scale.

Thus, according to the method of the Japanese patent publication No. 7491/65 (British Pat. No. 971,700), a 4-alkyl-acetophenone of the formula (VII):

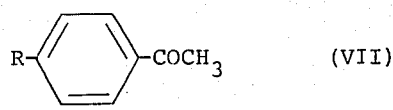

wherein R is an alkyl group is used as a starting compound and is converted into the desired 2-(4-alkylphenyl)-propionic acid of the formula (VI) via six reaction stages. This known method involves many stages of reaction and is not advantageous for the commercial production of the desired compound of the formula (VI).

According to the method of Japanese patent publication No. 22297/68 (British patent No. 971,700), a 4-alkylphenylethane derivative of the formula (VIII):

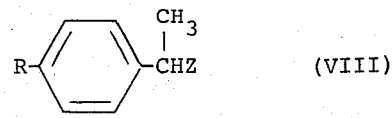

wherein R stands for an alkyl group and Z stands for a nitrile radical or a carboxylic acid ester radical is hydrolysed to give a corresponding 2-(4-alkylphenyl)propionic acid of the formula (VI). This known method suffers from a drawback that the starting compound of the formula (VIII) is difficult to prepare and hence is very expensive.

According to the method of Japanese patent publication No. 24550/72 (British Pat. No. 1,160,725), a glycidic ester of the formula (II):

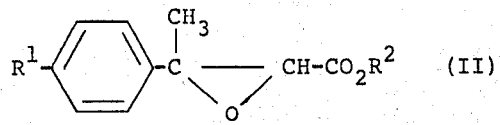

wherein R¹ represents an alkyl group of 2-4 carbon stoms and R² represents an alkyl group of 1–4 carbon atoms is used as the starting compound and is hydrolysed in the presence of an alkali metal hydroxide to give an alkali metal glycidate of the formula (IX):

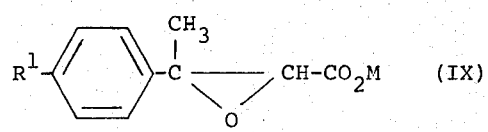

wherein R¹ has the same meaning as set out above and M represents an alkali metal, which is, in turn, treated with an acid to produce a propionaldehyde derivative of the formula (I):

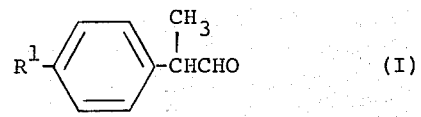

wherein R¹ has the same meaning as described above. The propionaldehyde derivative of the formula (I) is then oxidised to yield the desired 2-(4-alkylphenyl)-propionic acid of the formula (VI). This known method is not suitable for the commercial production of the aimed product (VI) because the intermediate product of the formula (IX) is instable and gives the compound of the formula (I) only in a low yield so that the overall yield of the final product (VI) is poor.

An object of this invention is to provide a new method of producing 2-(4-alkylphenyl)-propionaldehyde which can be operated in a facile way and give the desired product in a high yield and which is suitable to be carried out in a commercial scale. A further object of this invention is to provide a new route for the production of the 2-(4-alkylphenyl)-propionic acids. Other objects of this invention will be clear from the following description.

We have made our extensive research to achieve the above-mentioned purposes. As a result of our research, we have now found that when a 3-methyl-3-(4-alkylphenyl)-glycidic acid alkyl ester of the formula (II):

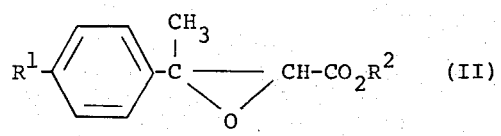

wherein R¹ and R² have the same meanings as defined above is treated with a Lewis acid in an aprotoic, polar solvent such as dimethylsulfoxide, dimethylformamide and isopropyl ether, there is formed a new substance, a 2-hydroxy-3-(4-alkylphenyl)-3-butenoic acid ester of the formula (X):

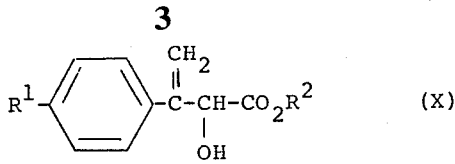

(X)

wherein $R^1$ and $R^2$ again have the same meanings as defined above in a high yield, and that this 2-hydroxy-3-(4-alkylphenyl)-3-butenoic acid ester of the formula (X) is readily convertible to the 2-(4-alkylphenyl)-propionaldehyde of the above-mentioned formula (I). We have further found that when the 2-hydroxy-3-(4-alkylphenyl)-3-butenoic acid ester of the formula (X) is hydrolysed, the ester group $R^2$ is easily removed therefrom, affording the corresponding 2-hydroxy-3-(4-alkylphenyl)-3-butenoic acid of the formula (V):

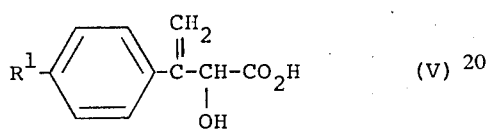

(V)

wherein $R^1$ has the same meaning as defined above. It is preferred that the 2-hydroxy-3-(4-alkylphenyl)-3-butenoic acid ester of the formula (X) should be hydrolysed in alkaline conditions which are provided by the presence of an alkali metal hydroxide such as sodium or potassium hydroxide, and in this case the butenoic acid of the formula (V) is produced in the form of the alkali metal salt thereof, which may readily be converted into the free acid form by treating with a mineral acid such as hydrochloric acid or sulfuric acid and which may also immediately be treated with an acid at an elevated temperature to give the propionaldehyde compound of the formula (I).

According to a first aspect of this invention, therefore, there is provided a process of preparing a 2-(4-alkylphenyl)-propionaldehyde of the formula (I):

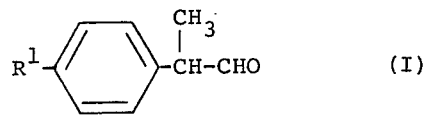

(I)

wherein $R^1$ stands for an alkyl group of 2-4 carbon atoms, which comprises treating a 2-hydroxy-3-(4-alkylphenyl)-3-butenoic acid ester of the formula (IV):

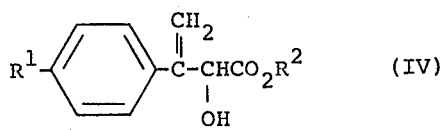

(IV)

wherein $R^1$ has the same meaning as defined above and $R^2$ is an alkyl group of 1-3 carbon atoms, with an acid.

According to a second aspect of this invention, there is provided a process of preparing a 2-(4-alkylphenyl)-propionaldehyde of the formula (I):

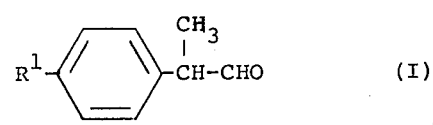

(I)

wherein $R^1$ is an alkyl group of 2-4 carbon atoms, which comprises hydrolysing a 2-hydroxy-3-(4-alkylphenyl)-3-butenoic acid ester of the formula (IV):

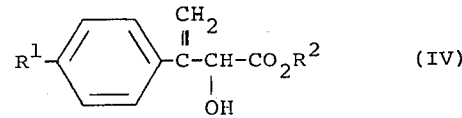

(IV)

wherein $R^1$ has the same meaning as defined above and $R^2$ is an alkyl group of 1-3 carbon atoms to liberate a 2-hydroxy-3-(4-alkylphenyl)-3-butenoic acid of the formula (V):

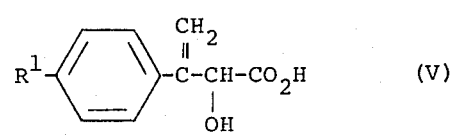

(V)

wherein $R^1$ has the same meaning as defined above, or a salt thereof, and then treating the butenoic acid compound of the formula (V) or the salt thereof with an acid to give the desired propionaldehyde compound of the formula (I).

In the known method of Japanese patent publication No. 24550/72, the intermediate product of the formula (IX) is unstable and gives the propionaldehyde compound of the formula (I) only in a low yield when treated with an acid. Accordingly, this known method is not suitable for the production of the propionaldehyde compound of the formula (I). In contrast, in the processes according to the first and second aspects of this invention, the butenoic acid compound of the formula (IV) which is employed as the starting compound in these processes is stable and gives the propionaldehyde compound of the formula (I) in a high yield. In addition, the processes of this invention can be operated in a facile way and are advantageous as a commercial process of producing the propionaldehyde compound of the formula (I), as compared to the above-mentioned known method.

In the process according to the first aspect of this invention, the starting butenoate compound of the formula (IV) is treated with an acid at an elevated temperature, giving the propionaldehyde compound of the formula (I) in a high yield. The acid available for this purpose may suitably be a mineral acid such as hydrochloric acid and sulfuric acid. When a lower aliphatic acid, notably an alkanoic acid of 2–4 carbon atoms such as acetic acid, propionic acid and butyric acid is present in the reaction mixture, the reaction can proceed very smoothly, and hence it is advantageous that such a lower aliphatic acid is employed as the reaction medium in which the reactants are dissolved. The acid treatment may suitably be carried out at a reaction temperature of 80°–100°C for a reaction time of about 5-10 minutes. The propionaldehyde compound of the formula (I) so produced, without isolation and purification thereof, may be oxidised to the 2-(4-alkylphenyl)-propionic acid of the formula (VI) by treating said propionaldehyde compound with a known oxidising agent in a known manner. A suitable oxidising agent for this purpose is silver oxide or potassium permanganate. Silver oxide may preferably be used under alkaline conditions in the presence of aqueous alkali metal hydroxide such as sodium or potassium hyroxide. Potassium permanganate may suitably be used in acidic condition, for example, in the presence of sulfuric acid.

In the process according to the second aspect of this invention, the starting butenoate compound of the formula (IV) is hydrolysed in the first stage, to liberate the butenoic acid compound of the formula (V) or a salt thereof in a favorable yield. The 2-hydroxy-3-(4-alkylphenyl)-3-butenoic acid compounds of the formulae (IV) and (V) are new substances which are not shown in any literature as far as we are aware of. For instance, methyl 2-hydroxy-3-(4-isobutylphenyl)-3-butenoate is an oily substance which is heat-stable and of which infrared absorption spectrum exhibits main peaks at 3480, 1740 and 860 cm$^{-1}$. Nuclear magnetic resonance spectrum thereof shows main absorption peaks (ppm.) at $\delta = 0.86$ (6H.d), 2.42 (2H.d), 3.57 (3H.s) and 4.91 (1H.s). 2-Hydroxy-3-(4-isobutylphenyl)-3-butenoic acid (in the formula (V), $R^1$ = isobutyl) as colorless needles having a melting point of 96.0°–97.2°C shows main peaks at 3380, 1740 and 850 cm$^{-1}$ in the infrared absorption spectrum thereof. The magnetic resonance spectrum thereof shows main absorption peaks at $\delta = 0.86$ (6H.d), 2.43 (2H.d) and 5.03 (1H.s). The hydrolysis of the butenoate compound of the formula (IV) may preferably be carried out in alkaline conditions in the presence of an aqueous alkali metal hydroxide such as sodium or potassium hydroxide, giving the alkali metal salt of the butenoic acid compound of the formula (V) as the hydrolysis product. This alkali metal salt of the butenoic acid may readily be converted into the free acid form by treating with an acid such as hydrochloric acid. The butenoic acid compound of the formula (V) so produced or a salt thereof is subsequently treated with an acid at an elevated temperature in the second stage of the process to give the propionaldehyde compound of the formula (I). The acid treatment of the butenoic acid compound of the formula (V) can be effected in the same manner using the same acid as when the acid treatment of the butenoate compound of the formula (IV) is carried out according to the first aspect of this invention. Thus, the butenoic acid compound of the formula (V) may be treated with a mineral acid such as hydrochloric acid or sulfuric acid at a temperature of 80-100°C for a time of about 5–10 minutes.

The propionaldehyde compound of the formula (I) produced by the processes of this invention may, if desired, be oxidised in a known manner with a known oxidising agent such as silver oxide or potassium permanganate to afford a 2-(4-alkylphenyl)-propionic acid of the formula (VI) which is a known, valuable anti-inflammatory agent. Accordingly, the processes of this invention may comprise further oxidising the 2-(4-alkylphenyl)-propionaldehyde of the formula (I) to give a corresponding 2-(4-alkylphenyl)-propionic acid of the formula (VI) or a salt thereof, so that there is provided a new route for the production of the 2-(4-alkylphenyl)-propionic acids.

2-Hydroxy-3-(4-alkylphenyl)-3-butenoic acid ester of the formula (IV) which is employed as the starting compound in the process of this invention may be prepared, for example, in the following way: An acetophenone derivative of the formula (X):

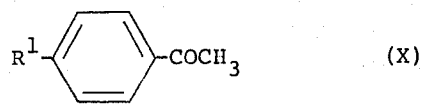 (X)

wherein $R^1$ is an alkyl group of 2–4 carbon atoms as described in the above is reacted with an α-haloacetic acid ester of the formula (XI):

$$XCH_2CO_2R^2 \qquad (XI)$$

wherein $R^2$ is an alkyl group of 1-3 carbon atoms and X is a halogen atom, particularly chlorine and bromine to produce the glycidic ester of the formula (II):

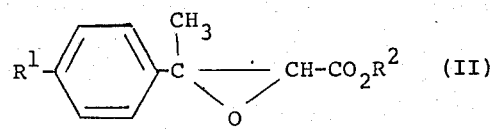 (II)

wherein $R^1$ and $R^2$ have the same meanings as defined above. The reaction of the acetophenone derivative of the formula (X) with the α-haloacetate of the formula (XI) may be carried out according to the method of Darzen's condensation.

The group $R^2$ may conveniently be methyl, ethyl or isopropyl. The condensation reaction may preferably be carried out in an inert atmosphere and under anhydrous conditions in the presence of an alkaline condensation catalyst which may be sodium amide or a sodium alkoxide such as sodium methoxide, sodium ethoxide, sodium isopropoxide and the like.

When the glycidic ester of the formula (II) so obtained is treated with a Lewis acid such as boron trifluoride aluminum chloride in an aprotoic polar solvent such as dimethylsulfoxide, dimethylformamide or isopropylether, there is formed the 2-hydroxy-3-(4-alkylphenyl)-3-butenoic acid ester of the formula (IV) in a high yield. Lewis acids available for this purpose may preferably be boron trifluoride, boron trifluoride etherate or aluminum chloride and may preferably be used at least in equi-molar proportion to the glycidic ester of the formula (II). If the Lewis acid is used in an amount of less than the equi-molar proportion to the glycidic ester, a part of the glycidic ester remains unreacted. The solvent in which the reaction of the glycidic ester of the formula (II) with Lewis acid takes place is not critical, as long as it is an aprotic, polar solvent. However, the solvent may conveniently be dimethylsulfoxide or dimethylformamide when boron trifluoride is used as the Lewis acid. The solvent may suitably be an ether of a relatively high-boiling point such as isopropylether. The reaction of the glycidic ester of the formula (II) with Lewis acid may preferably be carried out at a reaction temperature of about 0°C to about 100°C for a reaction time of about 30 minutes to 1 hour. The 2-hydroxy-3-(4-alkylphenyl)-3-butenoic acid ester of the formula (IV) so obtained may be isolated from the reaction mixture and then be purified in a facile way.

The 2-hydroxy-3-(4-alkylphenyl)-3-butenoic acid ester of the formula (IV) which is used as the starting compound in the process of this invention may also be prepared in another way, for example, by ring-opening the glycidic ester of the above-mentioned formula (II) through a treatment with a diluted mineral acid in tetrahydrofuran to produce a diol derivative of the formula (III):

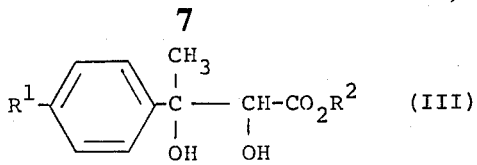

wherein $R^1$ and $R^2$ have the same meanings as defined above, which is then dehydrated through a treatment with p-toluenesulfonic acid in xylene.

The invention is now illustrated with reference to the following Examples to which this invention is not limited.

EXAMPLE 1

Preparation of methyl 2-hydroxy-3-(4-isobutylphenyl)-3-butenoate.

To a stirred mixture of 54.0 g of 4-isobutylacetophenone and 65.0 g of methyl chloroacetate was slowly added 30.0 g of sodium methoxide over 3 hours at a temperature of not more than 5°C under nitrogen atmosphere. The mixture was allowed to come to ambient temperature and stirred overnight. The mixture was then heated to a temperature of 80–90°C and agitated at this temperature for 1.5 hours. After cooling, the reaction mixture was admixed with ethyl ether, washed with water, dried over anhydrous sodium sulfate and distilled to remove the ether. The residue was distilled to afford 61.0 g of methyl 3-methyl-3-(4-isobutylphenyl)-glycidate. bp. 108°–112°C/0.2 mm Hg. Yield 80.0% (based on the theoretical).

The methyl 3-methyl-3-(4-isobutylphenyl)-glycidate (7.44 g) was dissolved in 30 ml of dry dimethylsulfoxide, and the solution was admixed with 5 ml of a solution of 47% boron trifluoride in ethyl ether under ice-cooling. The mixture was allowed to stand at ambient temperature for 2 hours and then poured into a volume of water. The aqueous mixture was extracted with ethyl ether and the ether extract was washed successively with water, aqueous sodium hydrogen carbonate, water and a saturated aqueous solution of sodium chloride and then was dried over anhydrous magnesium sulfate. The ethyl ether was distilled off under reduced pressure, and the residue was distilled to give 6.6 g of the desired compound. bp. 113°–115°C/0.2 mm Hg. Yield 88% (based on the theoretical).

Elemental analysis:
Calculated for $C_{15}H_{20}O_3$; C 72.55, H 8.12%
Found; C 71.99, H 8.18%

EXAMPLE 2

Preparation of ethyl 2-hydroxy-3-(4-t-butylphenyl)-3-butenoate.

To a stirred mixture of 26.4 g of 4-t-butylacetophenone and 16.2 g of ethyl chloroacetate was slowly added 10.2 g of sodium ethoxide over 30 minutes at a temperature of 10°–15°C. The mixture was allowed to come to room temperature and stirred at room temperature overnight and then heated to 85°C followed by further stirring at this temperature for 1.5 hours. After cooling, the reaction mixture was admixed with ethyl ether, washed with water, dried over anhydrous magnesium sulfate and distilled to remove the ethyl ether. Distillation of the residue gave 25.0 g of ethyl 3-methyl-3-(4-t-butylphenyl)-glycidate. bp. 108°–111°C/0.2 mm Hg. Yield 67% (based on the theoretical).

The ethyl 3-methyl-3-(4-t-butylphenyl)-glycidate (7.86 g) was taken up into 30 ml of dry dimethylformamide and the solution was admixed with 5 ml of a solution of 47% boron trifluoride in ethyl ether under ice-cooling. The mixture was subsequently processed in the same manner as in Example 1 to afford 6.30 g of the desired compound. bp. 115°–119°C/0.2 mm Hg. Yield 80% (based on the theoretical).

Elemental analysis:
Calculated for $C_{16}H_{22}O_3$; C 73.25, H 8.45%
Found; C 72.91, H 8.60%

EXAMPLE 3

Preparation of isopropyl 2-hydroxy-3-(4-isobutylphenyl)-3-butenoate.

Isopropyl 3-methyl-3-(4-isobutylphenyl)-glycidate (8.28 g) was dissolved in 30 ml of dry dimethylacetoamide and the solution so obtained was admixed with 5 ml of solution of 47% boron trifluoride in ethyl ether under ice-cooling. The mixture was subsequently processed in the same manner as in Example 1 to give 7.0 g of the desired compound. bp. 122°–124°C/0.2 mm Hg. Yield 85% (based on the theoretical).

Elemental analysis:
Calculated for $C_{17}H_{24}O_3$; C 73.88, H 8.75%
Found; C 74.01, H 8.91%

EXAMPLE 4

Production of 2-(4-isobutylphenyl)-propionaldehyde.

Methyl 2-hydroxy-3-(4-isobutylphenyl)-3-butenoate (7.50 g) was admixed with 50 ml of glacial acetic acid and 10 ml of concentrated hydrochloric acid. The mixture was heated at 90°C for 10 minutes with stirring. The reaction mixture was concentrated and the residue was admixed with water and the extracted with ethyl ether. The ether extract was washed successively with water, with aqueous sodium hydrogen carbonate and with water and finally dried over anhydrous magnesium sulfate. The extract was then evaporated under reduced pressure to remove the ether, and the oily residue (5.5 g) was distilled to give 4.8 g of the desired aldehyde compound. bp. 77°–78°C/0.2 mm Hg. Yield 84% (based on the theoretical).

Elemental analysis (in the form of the 2,4-dinitrophenylhydrazone):
Calculated for $C_{19}H_{22}O_4N_4$: C 61.61, H 5.99, N 15.13%
Found; C 61.40, H 5.96, N 15.42%

EXAMPLE 5

Production of 2-(4-t-butylphenyl)-propionaldehyde.

Ethyl 2-hydroxy-3-(4-t-butylphenyl)-3-butenoate (7.86 g) was admixed with 50 ml of glacial acetic acid and 10 ml of concentrated hydrochloric acid. The mixture was heated at 90°C for 10 minutes with stirring. The reaction mixture was subsequently processed in the same manner as in Example 4, affording 4.56 g of the desired aldehyde compound. bp. 70°–71°C/0.2 mm Hg. Yield 80% (based on the theoretical).

Elemental anaylsis (in the form of the 2,4-dinitrophenylhydrazone):
Calculated for $C_{19}H_{22}O_4N_4$; C 61.61, H 5.99, N 15.13%
Found; C 61.50, H 6.02, N 14.99%

EXAMPLE 6

Production of 2-(4-isobutylphenyl)-propionaldehyde.

i. Preparation of 2-hydroxy-3-(4-isobutylphenyl)-3-butenoic acid.

Methyl 2-hydroxy-3-(4-isobutylphenyl)-butenoate (2.0 g) was admixed with 20 ml of an aqueous solution of 5% potassium hydroxide and the mixture was heated for 5 hours under reflux with stirring. The insoluble matter was removed by extracting with ethyl ether, and the aqueous phase (solution) was acidified by addition of hydrochloric acid and then extracted with ethyl ether. The ether phase (extract) was washed with water and then with a saturated aqueous solution of sodium chloride and subsequently dried over anhydrous magnesium sulfate. The ether extract was distilled under reduced pressure to remove the ether, and the crude crystalline product so obtained was recrystallised from benzene-petroleum benzine, affording 1.55 g of 2-hydroxy-3-(4-isobutylphenyl)-3-butenoic acid. mp. 96.0°–97.2°C. Yield 82%.

Elemental analysis:
Calculated for $C_{14}H_{18}O_3$; C 71.77, H 7.74%
Found; C 71.56, H 7.86% ii. Formation of 2-(4-isobutylphenyl)-propionaldehyde.

2-Hydroxy-3-(4-isobutylphenyl)-3-butenoic acid (2.34 g) was admixed with 20 ml of glacial acetic acid and 6 ml of concentrated hydrochloric acid, and the mixture was heated at 90°C for 20 minutes. The reaction mixture was concentrated and then processed in the same manner as in Example 4 to afford 1.71 g of 2-(4-isobutylphenyl)-propionaldehyde. bp. 76°–77°C/0.2 mm Hg. Yield 90% (based on the theoretical).

Elemental analysis (in the form of the 2,4-dinitrophenylhydrazone):
Calculated for $C_{19}H_{22}O_4N_4$; C 61.61, H 5.99, N 15.13%
Found: C 61.69, H 6.10, N 15.41%

EXAMPLE 7

Production of 2-(4-t-butylphenyl)-propionaldehyde.

i. Preparation of 2-hydroxy-3-(4-t-butylphenyl)-3-butenoic acid.

Isopropyl 2-hydroxy-3-(4-t-butylphenyl)-3-butenoate (8.28 g) was admixed with 80 ml of a solution of 5% sodium hydroxide in methanol, and the mixture was heated for 1 hour under reflux. The reaction mixture was distilled under reduced pressure to remove methanol therefrom. The residue was admixed with water and the insoluble matter was removed by extracting with ethyl ether. The aqueous phase (solution) was acidified by addition of hydrochloric acid and extracted with ethyl ether. The ether extract was washed with water and then with a saturated aqueous solution of sodium chloride and subsequently dried over anhydrous magnesium sulfate. The ether extract was then distilled under reduced pressure, and the crude crystalline product so obtained was recrystallised from bezene-petroleum benzine, yielding 6.0 g of 2-hydroxy-3-(4-t-butylphenyl)-3-butenoic acid. mp. 88.8°–90.1°C. Yield 85% (based on the theoretical).

Elemental analysis:
Calculated for $C_{14}H_{18}O_3$; C 71.77, H 7.74%
Found: C 71.51, H 7.71% ii. Formation of 2-(4-t-butylphenyl)-propionaldehyde.

2-Hydroxy-3-(4-t-butylphenyl)-3-butenoic acid (7.02 g) was admixed with 60 ml of propionic acid and 20 ml of 50% sulfuric acid. The mixture was heated at 90°C for 20 minutes. The reaction mixture was subsequently processed in the same manner as in Example 4, affording 3.0 g of 2-(4-t-butylphenyl)-propionaldehyde. bp. 70°–71°C/0.2 mm Hg. Yield 53% (based on the theoretical).

Elemental analysis (in the form of the 2,4-dinitrophenylhydrazone):
Calculated for $C_{19}H_{22}O_4N_4$; C 61.61, H 5.99, N 15.13%
Found; C 61.59, H 6.08, N 14.98%

EXAMPLE 8

Production of 2-(4-isobutylphenyl)-propionic acid from 2-(4-isobutylphenyl)-propionaldehyde.

To a stirred suspension of 1.4 g of silver oxide in 20 ml of 6% aqueous sodium hydroxide was dropwise added 2.1 g of the 2-(4-isobutylphenyl)-propionaldehyde over 10 minutes 60°C with stirring. The mixture was further stirred at 60°C for 15 minutes and then allowed to stand. The precipitate was filtered off and washed with hot water. The filtrate and the washing liquor were combined together, and the insoluble matter was removed by extracting with ethyl ether. The remaining aqueous phase was acidified with hydrochloric acid and then extracted with ethyl ether, and the ether extract was washed with water, dried and then distilled under reduced pressure to remove the ether. The crude crystalline product so obtained was recrystallised from petroleum benzine, affording 1.3 g of 2-(4-isobutylphenyl)-propionic acid. mp. 74.8°–76.5°C. Yield 57% (based on the theoretical).

Elemental analysis:
Calculated for $C_{13}H_{18}O_2$; C 75.69, H 8.80%
Found; C 75.59, H 8.69%

EXAMPLE 9

Production of 2-(4-t-butylphenyl)-propionic acid from 2-(4-t-butylphenyl)-propionaldehyde.

To a stirred mixture of 2.0 g of 2-(4-t-butylphenyl)-propionaldehyde and 20 ml of 20% sulfuric acid was added 2.2 g of potassium permanganate over 10 minutes under ice-cooling. The mixture was further stirred for 1 hour at 8°–10°C under ice-cooling. Sodium hydrogen sulfate was added to the mixture and the stirring was continued for 10 minutes. The reaction mixture was extracted with ethyl ether, and the ether extract was then extracted with aqueous potassium carbonate to separate the acidic substance therefrom. The resulting aqueous potassium carbonate extract was made acidic by addition of hydrochloric acid and then extracted with ethyl ether. The ether extract so obtained was washed with water, dried and then distilled under reduced pressure to remove the ether. The crude crystalline product so obtained was recrystallised from petroleum benzine, affording 1.0 g of 2-(4-t-butylphenyl)-propionic acid. mp. 101°–103°C. Yield 46% (based on the theoretical).

Elemental analysis:
Calculated for $C_{13}H_{18}O_2$; C 75.69, H 8.80%
Found; C 75.76, H 8.69%

The preceeding examples can be repeated with similar success by substituting the generically or specifically described reactants and/or operating conditions of this invention for those used in the preceeding examples.

From the foregoing description, one skilled in the art can ascertain the essential characteristics of this invention and without departing from the spirit and scope thereof, can make various changes and modifications of the invention to adapt it to various usage conditions.

What we claim is:

1. A process for preparing a 2-(4-alkylphenyl)propionaldehyde of the formula

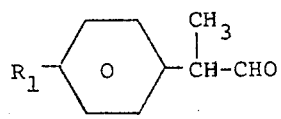

wherein $R_1$ is alkyl of 2–4 carbon atoms, which comprises reacting:

a. a 2-hydroxy-3-(4-alkylphenyl)-3-butenoic acid or ester of the formula

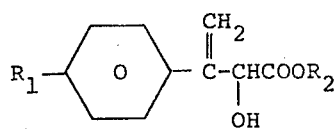

wherein R has the above-identified values and R is alkyl of 1–3 carbon atoms, hydrogen or an alkali metal cation, with b. a mineral acid at a reaction temperature of 80°–100°C. to form said propionaldehyde.

2. A process according to claim 1 wherein said mineral acid is hydrochloric acid or sulfuric acid.

3. A process according to claim 2 wherein the reaction time is about 5–10 minutes.

4. A process according to claim 1 wherein $R_2$ is hydrogen.

5. A process according to claim 4 wherein the reaction is effected in a lower aliphatic acid reaction medium.

6. A process according to claim 1 wherein the butenoic acid reactant or alkali metal salt thereof is prepared by hydrolysis of a corresponding ester wherein $R_2$ is alkyl of 1–3 carbon atoms with an alkali metal hydroxide.

7. A process according to claim 6 wherein the resultant alkali metal salt is neutralized with a dilute mineral acid to form the corresponding free acid, which is then reacted with said mineral acid.

8. A process according to claim 1 wherein $R_2$ is alkyl of 1–3 carbon atoms.

9. A process according to claim 8 wherein the reaction is effected in a lower aliphatic acid reaction medium.

10. A process according to claim 2 further comprising oxidizing the 2-(4-alkylphenyl)-propionaldehyde product to form the corresponding 2-(4-alkylphenyl)-propionic acid or a salt thereof.

* * * * *